Feb. 4, 1947.                H. P. BAUMANN.                2,415,271
                                  SAW
                            Filed July 11, 1944
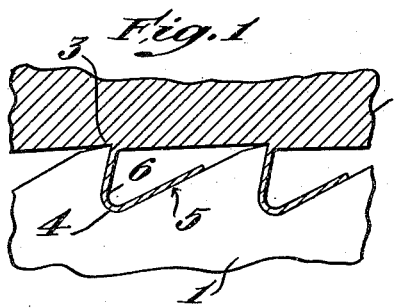
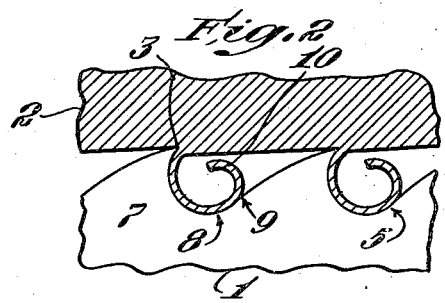
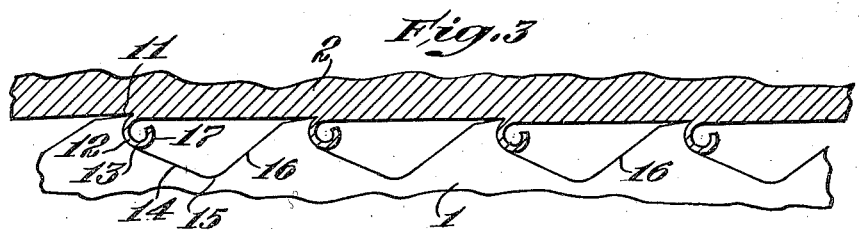
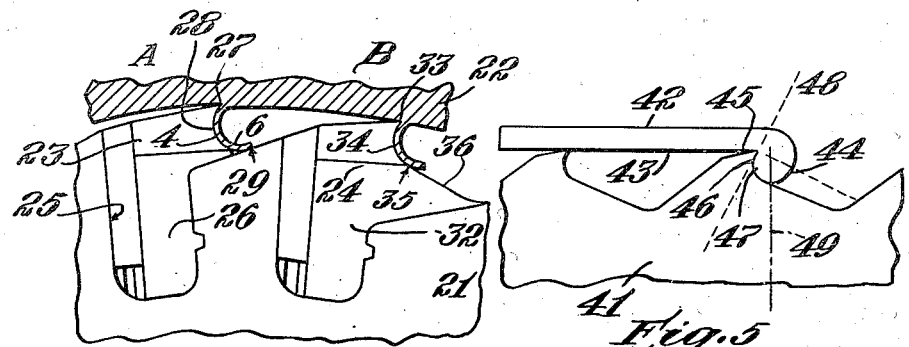
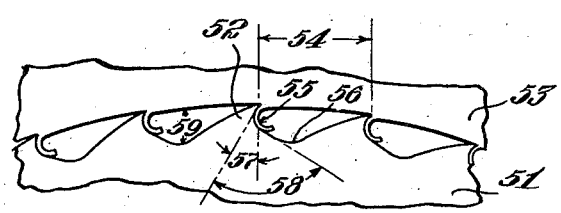
Inventor
Harry P. Baumann
by Roberts, Cushman, Grover
attys

Patented Feb. 4, 1947

2,415,271

UNITED STATES PATENT OFFICE 2,415,271

SAW

Harry P. Baumann, Milwaukee, Wis., assignor to Simonds Saw and Steel Company, Fitchburg, Mass., a corporation of Massachusetts Application July 11, 1944, Serial No. 544,392

2 Claims. (Cl. 29—95)

This method relates to an improved saw or saw tooth and to a method of making and/or restoring the same during use.

In the manufacture and use of saws, it is customary for the manufacturer to design the saw according to the most approved principles, and to make it of the most satisfactory materials known for the intended purpose which it is recommended to serve. The user of such saws accordingly, in re-sharpening or gumming his saws, endeavors to preserve the original design so far as possible in his grinding operations. Such procedure leads to a maximum suitability of the saws for any given purpose and to a maximum quality and quantity of service from any given saw.

However, it is found that in the original design of saws certain relations may obtain which are not without some attending difficulties, and that in the course of sharpening or gumming the grinding operation may, though following the same contours of the original blade, lead to increasing difficulties or even danger in its subsequent use.

If aluminum is cut with a standard saw having a C-shaped gullet, as shown in Fig. 2, the shaving cut by such a saw tooth will tend to curl upwardly upon itself or break against the surface of the work or both and, when sufficiently large in amount, crowd between such opposed surface and the cutting edge and thus be crushed into irregularly shaped pieces and fill and jam the normally open space of the gullet as a whole. If the gullet has the regular V-shape formed by a front radial or pitch line face meeting a rear plane face at an acute angle, the metal chip tends to roll into a tight spiral and to become lodged in the crevice between the back of the tooth and the work and sometimes to be carried around a second time before becoming separated from the saw. Any chip that becomes lodged may be fused to to the metal tooth and thus seriously hamper the cutting action or even cause breakage of the saw.

In the course of sharpening or gumming such saws, although the original contours of the saw blade may be carefully followed, the removal of metal and enlargement of the gullets may alter the relationship between the gullets and the cutting edges, so as to promote these difficulties.

In such cases there is danger of the saw being broken, with resulting damage to the machine or to the operator, and the least difficulty to be encountered under these circumstances is that of complete interruption of any further operations until the saw tooth has been cleared of the obstruction.

It is the primary object of this invention to overcome such problems and to provide a saw in which the tooth and gullet contours are such that the work chips will not clog the saw gullet or jam against the work face and will be freely and easily removed from the cut.

A further object is to provide a rotary saw in which metal may be cut rapidly and efficiently at a high speed and the saw gullets will transport the chips readily from the cut in such shapes and sizes that they will not interfere materially with the cutting operation. Other objects of the invention will appear from the following disclosure.

By the present invention it is discovered that if the tooth of a saw (with a forwardly projecting cutting edge formed between an upper surface and an under surface, meeting at an acute angle) is provided with an arcuate gullet, whose upper portion forms the under surface of the tooth and commences at the cutting edge and which is curved continuously downward, terminating at a point less than 180° from the cutting edge of the tooth, and then merges (at a tangent) with a second surface, forming a lower gullet portion, relatively larger and disposed somewhat below the first gullet portion, and which in turn merges into the upper surface of the next tooth of the saw, such a kind and degree of relief for the chips from the cutting edge and upper portion of the gullet will be afforded thereby, that the filling of the gullet and binding of chips therein, as above described, will not occur but will be substantially completely prevented.

Generically, it is found that by such novel construction the chip, as it is severed from the work and deflected by the cutting edge, is continuously forced along a concave surface having a small radius of curvature, relative to the gullet as a whole, and compared to that which would be formed by a single continuous curved surface of 180° or greater than 180° for it to follow. What is especially important is that before the chip reaches a point of the gullet surface, which may be regarded as opposite or opposed to the cutting edge, the chip is released from the surface of the chip-forming or upper portion of the gullet and overhangs the succeeding surface of the lower gullet, which presents a wider opening and also "drops" or falls away at this point. Hence, it does not continue to deform the advancing chip. Moreover, the curled chip, thus constituting less than a semi-circle or 180° of arc and passing around this surface of the gullet (which does not present opposed or oppositely retained portions which can make it bind between the walls of the upper gullet and thus cause or permit of jamming), is positively relieved and released and ejected from this portion of the gullet. The chip from some types of material may continue to curl and to coil upon itself, but is without and beyond any bearing surface by which it may be retained. Hence, it may curl but will extend free from the gullet surface and be relatively free until it strikes against the farther side of the main gullet opening. Then it will break between these points and the pieces fall into the main gullet. Likewise if it curls more sharply it strikes against the oncoming surface of the work. If the end of the chip curls still more sharply and coils inward to strike the portion of the chip following it, in the upper portion of the gullet, it will soon be crushed by the inward pressure between its own coils and hence into smaller particles. But these can not become jammed in the arc of the upper gullet, of less than 180°, which presents no diametrically opposite or opposed surfaces to receive or to retain them. A chip of aluminum or other soft material slides forward along the concave curve and thence along the gullet surfaces in a somewhat straight or extended, slightly curled or waved condition, but it is not forced into a tight spiral coil. Similarly, a wood chip tends to form an elongated wavy piece and not as a coil.

Moreover, by providing the second surface at a tangent to the end of the chip-forming gullet portion, and extending downwardly and of greater length than the surface of the chip-forming gullet portion, the growing chip will proceed from the cutting edge, follow the chip-forming gullet portion throughout its full length, and then protrude an equal distance beyond it without interruption. The latter portion of the chip will bear against and be guided along the second surface of the gullet, without meeting any obstruction or bearing surface to create a back pressure upon it. Upon then encountering a re-entrant angle or curl (which is of equal or greater radius of curvature than that of the gullet portion in which the chip was formed, and to which it was made to conform in the course of the cutting operation of the saw), it is deflected upwardly thereby and upon the upper or outer surface of the next tooth. The chip can not become jammed in this re-entrant angle or curve, for since it is of a less radius of curvature than the surface it will therefore ride smoothly up and over it. In being thus further bent, after extending without restriction from the chip-forming gullet portion, the chip will usually break off and fall out of the gullet, or if it is tough, the chip may be deflected sidewise out of the gullet by its own bending or by coming into contact with the surface of the work itself.

By providing this construction of the invention in new saws, or by grinding old saws, in the course of gumming or sharpening, so as to make them conform to such dimensions and relationships of the cutting edge and of the cutting edge portion and main portion of the gullet, filling and binding of the gullet by the chips from the cutting operation will be positively prevented.

Typical examples of the practical application of the invention are illustrated by the accompanying drawing, in which:

Fig. 1 shows saw teeth of the prior art, with an inclined V-shaped gullet, in the operation of cutting metal;

Fig. 2 shows saw teeth of the prior art, with a C-shaped gullet, in the operation of cutting metal;

Fig. 3 shows a straight saw, with teeth made in accordance with the invention, in the operation of cutting metal, the main portion of the gullet having a straight surface inclined forwardly from the termination of the upper portion of the gullet, on a tangent;

Fig. 4 shows two replaceable teeth in a circular saw, one (A) having a single curved gullet in accordance with the prior art, and the other (B) having a gullet made according to the present invention;

Fig. 5 shows a device for placing across successive pairs of saw teeth to ascertain the proper curvature and relationship of the upper or cutting edge portion of the gullet, both to the cutting edge and to the surface of the upper portion of the gullet; and Fig. 6 illustrates a circular saw, having teeth thereon, fashioned in accordance with the invention.

The drawing 1 to 4 and 6, in each case, represents a portion of a saw blade 1, as cutting into the work 2 in accordance with the usual operation of sawing.

If the front face of the tooth leading away from cutting edge 3 meets the rear gullet surface 5 (Fig. 1) at a sharp angle or through an arc 4 of 180° or more, then if the chip tried to follow the surfaces of such a gullet, it would break and the fractured pieces might lodge between the work kerf and the side of the saw blade. It is found, however, that an aluminum chip tends to curl into a tight spiral against the forward radial face of a V-shaped tooth, and this may bind in the V-shaped gullet, fill it, and then jam against the work in the subsequent operation of the saw, soon bring it to a stop, stalling the machine, or breaking the saw blade itself. Thus, in the gullet of the saw shown in Fig. 1, the curvature is so sharp that a soft chip will follow it only with difficulty, without breaking. But if it does not break and continues as far as shown in the drawing, it is clear that it will tend to bind across the diameter of the gullet against further movement or removal. In Fig. 2, where the radius of curvature of the C-shaped gullet is larger, the chip will more readily follow the curvature of the gullet from the edge 7 for a greater distance along the arc 8. But it nevertheless presents a diametrically opposed surface at 9 opposite to the cutting edge of the saw tooth, which is capable of causing the chip 10 to bind as soon as or shortly after it reaches this point. In breaking, the fragments may be smaller or greater than the 180° arc upon which it is forming, and it may or may not escape laterally from the gullet of the saw. But it is clear that if the chip 10 is larger than 180° and does not snap clear, it will be firmly seated in the gullet of the saw under the pressure of the sawing action, and this or subsequently formed chips will soon fill the gullet and jam between the saw and the work. An aluminum chip breaks into small irregularly shaped fragments, and some of these may fuse onto the saw tooth under the pressure applied within the narrow V-shaped portion of the gullet.

In Fig. 3 the saw 1 has a cutting edge 11 from which the surface 12 of the upper gullet curves inwardly and downwardly through an arc of less than 180° to the point 13 at which the surface 14 of the lower gullet portion declines forwardly as a straight line tangent to the curved surface at the point 13. It continues to fall away or drop for a distance at least equal to or several times greater than the chord of the upper gullet curve to a low point, whence it forms a reentrant angle or curve and then at 15 inclines upwardly to form the upper surface of the next tooth, at the point 16, though more or less opposite to the cutting edge 11, it is far removed from and out of the line of curvature of the surface 12 and is not opposed thereto, and hence the chip 17, shaped to conform to the curved gullet portion 12, can not possibly extend to and bind against the inclined slope 16, which leads to the upper surface of the next tooth of the saw.

In Fig. 4 the circular saw 21 is shown in operation upon the curved piece of metal 22 by means of replaceable teeth (A, B) at 23, 24. Of these the former is mounted in the socket 25 by means of a suitable holder 26, and presents a cutting edge 27 followed by a single-curved gullet 28 which, in conjunction with the saw 21, presents a bearing surface 29, which is diametrically opposite from and hence opposed to the cutting edge 27 and to the force of the cutting action of the metal. This will force the removed metal or chip outwardly and tend to make it bind between the two points upon extending from one to the other.

The second tooth 24, as shown, is made in accordance with the present invention and is mounted in the saw by a suitable holder 32. It is characterized by having a cutting edge 33 and a chip-forming gullet, the upper portion of which is formed by the arc 34, to the point 35, which is less than 180° from the cutting edge, and thence leading into the curvature 36 of the lower and larger gullet. The latter, in conjunction with the space between the tooth, the holder and the saw itself, affords ample relief for the chips coming from the upper, and smaller, gullet portion.

Of course, both types of gullet, as shown in Fig. 4, would not be provided in the same saw. They are shown together merely for convenience and for comparison of the prior art construction with that afforded by the present invention.

In Fig. 5, a saw 41, similar to that in Fig. 3, is shown, with which a gauge device 42 is shown having a straight-line surface 43 from which projects the depending circular surface 44 forming an angular notch 45 therebetween adapted to receive and fit snugly over the cutting edge 46 of the saw. The under surface 47 of the cutting edge, forming the arc of curvature of the upper gullet, should fit snugly against the curved surface 44 of the gauge device 42. The dotted line 48 represents a tangent to the inner arcuate surface at the cutting edge and the dotted line 49 is a perpendicular to the straight-line surface 42, passing through the center of curvature of the circular surface 44 of the gauge and likewise of the under surface 47 of the cutting edge.

It will be observed that a perpendicular extended from the dotted line 48 at the cutting edge extends beyond and does not strike the curved surface 47, which forms an arc of less than 180°. Likewise the dotted line 4 does not strike this curved surface of the gullet or of the corresponding portion of the curved surface of the gauge device. The center of curvature of the arc of the surface 47 falls beyond the area subtended by its chord and hence any outward pressure from the cutting edge on the chip and any downward pressure imposed thereon by the work surface, as indicated by the straight line 49, is not effective to bend the chip within the chip-forming or upper portion of the gullet but rather to break off the chip into the larger space of the main, lower gullet opening.

A significant feature of a saw tooth of the character provided by the invention is that the upper or chip-forming portion of the gullet, being of less than 180° of arc, does not present a chip-retaining recess but one through which it will continuously feed from the cutting edge of the tooth and continuously discharge without binding.

By merging the termination of the surface of such a chip-forming gullet portion with the second surface, at a tangent thereto, the chip will be diverted away from and downward with reference to the cutting edge of the tooth. The surface thus forms an enlarged gullet portion, below the chip-forming gullet portion of the tooth, but continues positively to guide the chip rather than to let it go free from the chip-forming surface. Moreover, by extending this second surface for a distance equal to or greater than the chord of the upper or chip-forming gullet portion, this lower gullet portion will be capable of receiving the unsupported chip as it extends from the chip-forming gullet portion, without presenting a supporting or opposing surface thereto against which it can bind and be forced back against the cutting edge or the surface of the chip-forming gullet portion. At the end of such second surface, remote from the cutting edge of the tooth and remote from the end of the chip-forming gullet surface, the second surface may merge into a reentrant angle or curve (and also at a tangent) which leads upwardly to the upper side or surface of the next tooth of the saw, still without presenting any surface which shall be opposite or opposed to the cutting edge of the first tooth. This reentrant angle or curve is preferably of an equal or greater angle or radius of curvature than the chip-forming gullet. Any coiled chips subtending the space between the cutting edge or chip-forming gullet portion and the reentrant curve adjacent to the upper portion of the next tooth will be of less diameter than this distance, and hence it will require the equivalent of two or more chips to subtend any such points, at least one of which chips will consequently be suspended free and without engagement or support. Moreover, being inherently of an equal or less radius of curvature than the reentrant curve, it will not bind therein so as to oppose the portion of the chip in the chip-forming gullet portion. Hence, if it does not break it can and will continuously feed along the second surface, through the re-entrant curve surface and up and over the outer surface of the next tooth. A chip, sufficiently tough or strong to pass through such a tortuous course, would then contact with the work, and either be broken or at least bend laterally to escape completely and intact from the saw gullet. Upon the fracture of the chip, the pieces must fall free and be eliminated from the gullet of the saw for there are no points or surfaces of parallel opposition between which they can subtend and be supported so as to resist and bind.

This saw construction comprises short, fine cutting teeth formed by the arcuate surface 12 (Fig. 3) and the associated surfaces providing the transverse knife edge 11. These cutting teeth are of small size suitable for use in a fine pitched saw. They are carried on coarse pitched tooth bodies formed by the front and rear surfaces 14 and 16 that lie at an obtuse angle to each other and form a rigid and wide, substantially triangular support for each fine cutting tooth, which thereby minimizes vibration. The cutting tooth produces a chip of a type that is determined in part by the shape and size of the tooth; while the opposed surfaces of adjacent tooth bodies provide a shallow but extensive drop-bottom gullet that receives the chip from the fine tooth and carries it forward through the cut with ample room for all of the chip material. The V-type tooth of Fig. 1 has a front face extending to the bottom of the gullet which is about perpendicular to the line of motion so that this face tends to hold a chip stationary while it coils. The construction of Fig. 2 acts similarly. In the saw of Fig. 3, the undercut arcuate tooth surface 12 curves forward of the cutting edge and merges smoothly with the drop-bottom gullet face 14. The latter is ahead of the tooth edge and slopes primarily forward at an acute angle less than about 45° to and away from the cutting line, so that the chip will slide readily thereover and not be retarded materially by the forward motion of the tooth body. Hence, a wood or a soft metal shaving tends to slide in an extended condition along the gullet faces and not to be coiled into a tight spiral. But, even if a spiral is produced, the drop-bottom faces of the gullet provide ample room therefor and the coiled chip cannot bind against the work.

The invention is especially applicable and effective in metal-cutting saws, the teeth of which fall accurately in the trace of one another and are for the most part without appreciable set or bevel, and are not arranged with follower teeth, as in wood-cutting saws. But the principles involved are applicable to wood-cutting saws or other saws in so far as they present the chip-jamming propensities of metal-cutting saws.

As will appear from Fig. 6, in which a circular saw 51 is shown having teeth 52 fashioned therein in accordance with the invention, for cutting metal 53, the relative dimensions are indicated by the several numerals in the directions of the arrows, as follows: 54 the pitch of the teeth, measured from the cutting edge of one tooth to the cutting edge of the next tooth; 55 the radius of curvature of the chip-forming portion of the gullet; 56 the radius of curvature of the reentrant curve; 57 the angle between a perpendicular to the line between the cutting edges of the teeth (similar to dotted line 49 in Fig. 5) and a tangent to the curved surface of the chip-forming portion of the gullet at the cutting edge of the tooth; 58 is the angle between the declining surface of the gullet which is tangent to the chip-forming portion of the gullet and the tangent to the chip-forming portion of the gullet at the cutting edge of the tooth; and 59 is the total depth of the gullet.

It is found that in saws designed for metal-cutting purposes the ratio of the depth of the gullet to the pitch is preferably about 1:3 while in saws for cutting wood, where the invention is applied, this ratio is preferaby about 2:5.

The front face of the tooth may be considered as terminating at the lower end of the concave surface 12 (Fig. 3) since the chip bending or directing effort ceases where the surface 14 merges with the concave. Below this point, the chip slides forward freely into the expansive gullet storage space, the bottom of which is well below the concave. The distance between adjacent cutting edges, or the pitch of the saw, is several times the length of the maximum chord of the concave, which in a way measures the size of the cutting tooth. Hence, this tooth spacing, or pitch, is much greater than is indicated by the size of the tooth. This provides less cutting teeth in contact with a given length of work for a given tooth size and so cuts down the friction and other resistant forces and permits increasing the saw speed, with a greater ease of cutting and improved efficiency of operation.

This application is a continuation in part of my application Serial No. 482,241, filed April 8, 1943.

I claim:

1. A saw comprising a narrow, substantially parallel walled metal body having short fine cutting teeth terminating and supported by coarse pitched tooth bodies separated by gullets, each tooth having a transverse straight knife edge formed by an acute angle intersection of an outer peripheral surface and a continuous under surface providing a short concave which receives the chip and directs it down and forwards, each tooth body being formed by a non-reentrant front gullet surface different from and merging into the lower end of said concave in front of the cutting edge, which slopes primarily at an acute angle to and away from the cutting line, and by a rear gullet surface which slopes rearwardly at an acute angle to and away from the cutting line, the two gullet surfaces being different in shape but merging through an arcuate surface to form a long, shallow, non-angular gullet of greater depth and length than the maximum chord of said concave, the arc of the concave being materially less than 180° so that a work chip will slide freely from the concave onto and along the gullet surfaces.

2. A saw comprising a narrow, substantially parallel walled, axially rotatable disk having short, fine cutting teeth terminating and supported by coarse pitched, wide based tooth bodies separated by gullets, each tooth having a transverse, axially parallel, straight knife edge formed by an acute angle intersection of an outer peripheral surface and a continuous undercut surface providing a short concave, each tooth body having as its forward side a non-reentrant gullet surface different from and merging through an expanding curve into the lower end of the concave in front of the cutting edge and which slopes primarily forward at an acute angle to and away from the cutting line, the rear surface of each tooth body sloping rearwardly at an acute angle to and away from the cutting line and merging with the forward gullet surface of the adjacent rear tooth body through an arcuate surface substending an angle which is at least as great as that of the concave, said surfaces providing a long, shallow, continuous, non-angular gullet of greater depth than and several times the length of the maximum chord of said concave, and the diameter of a chip coiled thereon, the arc of the concave being materially less than 180° and the gullet providing no chip contacting surface opposed to the cutting edge diametrically of a chip that is coiling in conformity with said concave, so that the chip tends to slide longitudinally from the concave onto and along the gullet surfaces.

HARRY P. BAUMANN.

REFERENCES CITED

The following references are of record in the file of this patent:

UNITED STATES PATENTS

| Number | Name | Date |
|---|---|---|
| 1,936,242 | Orr | Nov. 21, 1933 |
| 580,950 | McCoy | Apr. 20, 1897 |
| 725,469 | Miner | Apr. 14, 1903 |
| 190,062 | Miller | Apr. 24, 1877 |
| 2,215,616 | Lapointe, et al. | Sept. 24, 1940 |